(12) United States Patent
Khosla et al.

(10) Patent No.: US 12,496,192 B2
(45) Date of Patent: Dec. 16, 2025

(54) HYDRAULIC TAPER SEPARATOR FOR ORTHOPAEDIC IMPLANT SYSTEMS AND METHODS OF DISASSEMBLY

(71) Applicant: ARTHREX, INC., Naples, FL (US)

(72) Inventors: Rudraksh Khosla, Naples, FL (US); Jerry Sterrett, Bonita Springs, FL (US)

(73) Assignee: ARTHREX, INC., Naples, FL (US)

( * ) Notice: Subject to any disclaimer, the term of this patent is extended or adjusted under 35 U.S.C. 154(b) by 92 days.

(21) Appl. No.: 18/404,307

(22) Filed: Jan. 4, 2024

(65) Prior Publication Data
US 2025/0221822 A1    Jul. 10, 2025

(51) Int. Cl.
*A61F 2/28*     (2006.01)
*A61F 2/30*     (2006.01)

(52) U.S. Cl.
CPC ........ *A61F 2/28* (2013.01); *A61F 2002/2853* (2013.01); *A61F 2220/0033* (2013.01); *A61F 2250/006* (2013.01)

(58) Field of Classification Search
None
See application file for complete search history.

(56) References Cited

U.S. PATENT DOCUMENTS

| | | |
|---|---|---|
| 4,012,796 A | 3/1977 | Weisman et al. |
| 5,358,526 A | 10/1994 | Tornier |
| 5,507,817 A | 4/1996 | Craig et al. |
| 5,507,830 A | 4/1996 | DeMane et al. |
| 5,746,771 A | 5/1998 | Clement, Jr. et al. |
| 5,858,020 A * | 1/1999 | Johnson ............ A61F 2/36 606/78 |
| 6,436,145 B1 | 8/2002 | Miller |
| 6,447,549 B1 | 9/2002 | Taft |
| 6,866,683 B2 | 3/2005 | Gerbec et al. |
| 7,070,662 B2 | 7/2006 | Brown et al. |
| 7,175,664 B1 | 2/2007 | Lakin |
| 7,604,637 B2 * | 10/2009 | Johnson ............ A61F 2/30724 606/81 |
| 7,621,961 B2 | 11/2009 | Stone |
| 7,867,282 B2 | 1/2011 | Heck et al. |

(Continued)

FOREIGN PATENT DOCUMENTS

| | | | |
|---|---|---|---|
| EP | 0898946 | 3/1999 | |
| EP | 4218609 A1 * | 8/2023 | ......... A61B 17/8866 |

(Continued)

OTHER PUBLICATIONS

Product Brochure. Exactech | Shoulder Design Rationale. Equinoxe Platform Shoulder System—Humeral Reconstruction Prosthesis. Retrieve from: https://www.exac.com/wp-content/uploads/2022/04/718-08-40_Equinoxe_Humeral_Reconstruction_Prosthesis_Design-Rationale.pdf.

(Continued)

*Primary Examiner* — Ann Hu
(74) *Attorney, Agent, or Firm* — Carlson, Gaskey & Olds, P.C.

(57) ABSTRACT

This disclosure relates to orthopaedic implant systems and methods for restoring functionality to a bone and/or joint. The implant systems disclosed herein may include a taper connection between components. A hydraulic actuation device may be utilized to separate the components at the taper connection. A method of disassembling orthopaedic components is also disclosed.

20 Claims, 9 Drawing Sheets

(56) References Cited

U.S. PATENT DOCUMENTS

| | | |
|---|---|---|
| 8,118,875 B2 | 2/2012 | Rollet |
| 8,353,702 B1 * | 1/2013 | Nike .................... A61C 8/0071 |
| | | 433/173 |
| 8,454,706 B2 | 6/2013 | de Beaubien |
| 8,500,815 B2 | 8/2013 | Fockens |
| 8,500,819 B2 | 8/2013 | Meridew et al. |
| 8,556,912 B2 | 10/2013 | Leisinger |
| 8,696,751 B2 * | 4/2014 | Ashley ................... A61F 2/441 |
| | | 623/17.16 |
| 9,039,778 B2 | 5/2015 | Burnikel |
| 9,095,452 B2 | 8/2015 | Huff et al. |
| 9,308,005 B2 | 4/2016 | Fitz et al. |
| 9,333,090 B2 * | 5/2016 | Donner .............. A61B 17/7055 |
| 9,775,714 B2 | 10/2017 | Kurtz |
| 9,814,583 B2 | 11/2017 | Aquilo et al. |
| 10,251,752 B2 | 4/2019 | Satterthwaite et al. |
| 10,390,972 B2 | 8/2019 | Rao |
| 10,736,747 B2 | 8/2020 | May et al. |
| 10,765,524 B2 | 9/2020 | Boileau et al. |
| 10,799,335 B2 | 10/2020 | Treacy et al. |
| 10,905,561 B2 | 2/2021 | Roche et al. |
| 11,357,562 B2 | 6/2022 | Matyas et al. |
| 2005/0027370 A1 * | 2/2005 | Chen ....................... A61F 2/644 |
| | | 623/44 |
| 2005/0125067 A1 | 6/2005 | Sweeney |
| 2005/0261699 A1 * | 11/2005 | Neubauer .............. A61B 90/11 |
| | | 606/96 |
| 2006/0155381 A1 | 7/2006 | Katzman |
| 2006/0173415 A1 | 8/2006 | Cummins |
| 2007/0270973 A1 * | 11/2007 | Johnson ................ A61F 2/4609 |
| | | 623/17.16 |
| 2010/0057204 A1 * | 3/2010 | Kadaba ................. A61F 2/4455 |
| | | 623/17.12 |
| 2011/0029089 A1 | 2/2011 | Giuliani et al. |
| 2011/0060417 A1 | 3/2011 | Simmen et al. |
| 2014/0236304 A1 | 8/2014 | Hodorek et al. |
| 2016/0051368 A1 | 2/2016 | Wiley et al. |
| 2016/0166410 A1 * | 6/2016 | Dressler .................. F16F 9/446 |
| | | 188/280 |
| 2016/0206436 A1 | 7/2016 | Chavarria et al. |
| 2019/0201215 A1 * | 7/2019 | Wozencroft .......... A61F 2/4609 |
| 2021/0085474 A1 | 3/2021 | Courtney, Jr. et al. |

FOREIGN PATENT DOCUMENTS

| | | | | |
|---|---|---|---|---|
| WO | WO-0027318 A1 * | 5/2000 | ............... A61F 2/64 |
| WO | WO-03068078 A1 * | 8/2003 | ........... A61F 2/4684 |
| WO | WO-2006097932 A2 * | 9/2006 | ......... A61B 17/1684 |
| WO | WO-2017132646 A1 * | 8/2017 | ......... A61B 17/8019 |
| WO | 2022261508 | 12/2022 | |

OTHER PUBLICATIONS

Product Brochure. Exactech | Shoulder Operative Technique. Equinoxe Shoulder System—Humeral Reconstruction Prosthesis. Retrieved from: https://www.exac.com/wp-content/uploads/2022/03/718-08-30_RevB_Humeral_Reconstruction_Prosthesis_Operative_Technique_Web.pdf.

Product Brochure. Design Rationale. Tornier Aequalis Flex Revive Shoulder System. Wright.

Product Brochure. Surgical Technique. Tornier Aequalis Flex Revive Shoulder System. Wright.

Product Brochure. Surgical Technique. Comprehensive Segmental Revision System. Zimmer Biomet.

International Preliminary Report on Patentability for International Application No. PCT/US2024/056805 mailed Mar. 5, 2025.

* cited by examiner

HYDRAULIC TAPER SEPARATOR FOR ORTHOPAEDIC IMPLANT SYSTEMS AND METHODS OF DISASSEMBLY

BACKGROUND

This disclosure relates to orthopaedic procedures and, more particularly, to orthopaedic implant systems and methods for repairing bone defects and restoring functionality to a joint.

Orthopedic implants may include modular components which may be assembled and locked together with a taper connection. The surgeon may desire to separate the components from each other. One technique includes utilizing a pickle fork tool that may serve as a wedge between the components for releasing the taper connection. Another technique includes threading a tool with a non-threaded nose onto the component. The non-threaded nose may engage the adjacent component to release the taper connection in response to pushing the components away from each other.

SUMMARY

This disclosure relates to orthopaedic implant systems and methods for restoring functionality to a joint. The implant systems may include one or more components coupled together at a tapered connection. Hydraulic pressure may be utilized to release the tapered connection. Pressurized fluid may be conveyed through a fluid passage that may be transverse to the tapered connection.

An orthopaedic implant system may include a head component associated with an articulation surface that may be dimensioned to mate with an opposed articular surface of an adjacent implant or an adjacent bone. A mounting component may include a mounting body. The mounting body may include a fluid passage interconnecting a tapered recess and a mounting bore. The mounting bore may extend from an engagement face and may be dimensioned to receive a fastener for securing the head component along the engagement face. The tapered recess may extend along a first axis. The mounting bore may extend along a second axis transverse to the first axis. A second component may include a tapered portion insertable in the tapered recess to establish a taper connection. A hydraulic pump may include an interface portion dimensioned to engage the mounting bore. The pump may be adapted to communicate fluid through the fluid passage to cause separation of the taper connection.

An orthopaedic implant system may include a head component associated with an articulation surface that may be dimensioned to mate with an opposed articular surface of an adjacent implant or an adjacent bone. A mounting component may include a mounting body. The mounting body may include a first tapered portion and a mounting bore. The mounting bore may extend from an engagement face and may be dimensioned to receive a fastener for securing the head component along the engagement face. The mounting bore may be transverse to the first tapered portion. A second component may include a second tapered portion dimensioned to cooperate with the first tapered portion to establish a taper connection and a localized cavity. A hydraulic pump may be adapted to communicate fluid through the mounting bore to cause separation of the taper connection in response to pressurizing the localized cavity.

A method of disassembling a component of an orthopaedic implant system may include fluidly coupling a hydraulic pump to a mounting bore of a first component. The first component may include a mounting bore and a first tapered portion that may engage a second tapered portion of a second component coupled to bone to establish a taper connection and a localized cavity. The first tapered portion may extend along a first axis. The mounting bore may extend along a second axis that may be transverse to the first axis. The method may include conveying fluid from the coupled hydraulic pump to release the tapered connection in response to pressurizing the localized cavity.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

This disclosure relates to orthopaedic implant systems and methods for repairing bone defects and restoring functionality to various joints. The disclosed implant systems described herein may include a modular implant that may be adapted to facilitate reconstruction or repair of a bone or joint. The orthopaedic implant may include components secured to each other by a taper connection.

The disclosed techniques may be utilized to release taper connections between components of an orthopaedic implant. The components may be separated from each other in response to releasing the taper connection. The disclosed techniques may be utilized intraoperatively to disassemble a component implanted during the same surgery or may be utilized in a revision surgery in which a component implanted in the patient during a prior surgery may be replaced with another component or otherwise removed. A hydraulic force may be utilized to separate the taper connection.

The hydraulic force may be generated by an actuation device (e.g., hydraulic taper separator) that may be operable to communicate a pressurized fluid. The actuation device may be coupled to the implant at a threaded connection. The actuation device may be a hydraulic pump including a plunger. The surgeon may at least partially fill a cavity of the pump and/or a fluid passage in the component(s) with an amount of the fluid. The components may be aligned along an axis to establish the taper connection. The fluid passage may be perpendicular or oblique to the axis. The fluid may be pressurized by advancing a plunger through the pump cavity. The surgeon may impact the plunger to cause the taper connection to separate in response to pressurizing the fluid. In other implementations, the surgeon may advance the plunger by threading the plunger along a body of the pump to cause the fluid to pressurize.

An orthopaedic implant system may include a head component associated with an articulation surface that may be dimensioned to mate with an opposed articular surface of an adjacent implant or an adjacent bone. A mounting component may include a mounting body. The mounting body may include a fluid passage interconnecting a tapered recess and a mounting bore. The mounting bore may extend from an engagement face and may be dimensioned to receive a fastener for securing the head component along the engagement face. The tapered recess may extend along a first axis. The mounting bore may extend along a second axis transverse to the first axis. A second component may include a tapered portion insertable in the tapered recess to establish a taper connection. A hydraulic pump may include an interface portion dimensioned to engage the mounting bore. The pump may be adapted to communicate fluid through the fluid passage to cause separation of the taper connection.

In any implementations, the head component may include a head bore. The head bore and the mounting bore may be dimensioned to receive the fastener to attach the head component and the mounting component to each other such that the fastener may block access to the fluid passage.

In any implementations, the tapered portion and surfaces of the mounting body bounding the tapered recess may cooperate to define a localized cavity in response to establishing the taper connection. The fluid passage may interconnect the localized cavity and the mounting bore. A volume of the localized cavity may be less than a combined volume of the mounting bore and the fluid passage. The volume of the localized cavity may be less than approximately 25 percent of the combined volume of the mounting bore and the fluid passage.

In any implementations, the mounting body may define a second recess between the tapered recess and the fluid passage. The second component may include a protrusion extending outwardly from the tapered portion to a free end of the second component. A maximum diameter of the protrusion may be less than a minimum diameter of the second recess. The protrusion may be insertable in the second recess to establish the localized cavity that may extend about a periphery of the protrusion.

In any implementations, the hydraulic pump may include a pump body and a plunger insertable in a cavity of the pump body. The plunger may be movable to cause pressurization of the fluid passage.

In any implementations, the hydraulic pump may include at least one seal adapted to establish a sealing relationship between the plunger and surfaces of the cavity.

In any implementations, the head component may be adapted to mount an articulation component establishing the articulation surface.

In any implementations, the mounting body may extend along a longitudinal axis between a first end and a second end. The tapered recess may extend inwardly from the second end. The engagement face may be dimensioned to extend along a reference plane oblique to the longitudinal axis.

In any implementations, the first axis of the tapered recess may be substantially parallel to the longitudinal axis.

In any implementations, the mounting bore may widen from a fluid port that interconnects the mounting bore and the fluid passage.

In any implementations, the second component may be a stem insertable in bone.

In any implementations, the bone may be a humerus.

An orthopaedic implant system may include a head component associated with an articulation surface that may be dimensioned to mate with an opposed articular surface of an adjacent implant or an adjacent bone. A mounting component may include a mounting body. The mounting body may include a first tapered portion and a mounting bore. The mounting bore may extend from an engagement face and may be dimensioned to receive a fastener for securing the head component along the engagement face. The mounting bore may be transverse to the first tapered portion. A second component may include a second tapered portion dimensioned to cooperate with the first tapered portion to establish a taper connection and a localized cavity. A hydraulic pump may be adapted to communicate fluid through the mounting bore to cause separation of the taper connection in response to pressurizing the localized cavity.

In any implementations, the first tapered portion of the mounting component may include a female taper. The second tapered portion of the second component may include a male taper dimensioned to engage the female taper to establish the taper connection.

In any implementations, the hydraulic pump may be releasably securable to the mounting bore at a threaded connection.

A method of disassembling a component of an orthopaedic implant system may include fluidly coupling a hydraulic pump to a mounting bore of a first component. The first component may include a mounting bore and a first tapered portion that may engage a second tapered portion of a second component coupled to bone to establish a taper connection and a localized cavity. The first tapered portion may extend along a first axis. The mounting bore may extend along a second axis that may be transverse to the first axis. The method may include conveying fluid from the coupled hydraulic pump to release the tapered connection in response to pressurizing the localized cavity.

In any implementations, the first tapered portion of the first component may include a female taper. The second tapered portion of the second component may include a male taper that may engage the female taper to establish the tapered connection.

In any implementations, the method may include disassembling a head component from the first component. The head component may be associated with an articulation surface that may be dimensioned to mate with an opposed articular surface of an adjacent implant or an adjacent bone.

In any implementations, the step of disassembling the head component from the first component may include removing a fastener from the mounting bore that may secure the head component and the first component to each other.

In any implementations, the hydraulic pump may include a pump body and a plunger insertable in a cavity of the pump body. The conveying step may include actuating the plunger to cause the fluid to flow from the pump body to the localized cavity.

In any implementations, the second component may be a stem at least partially inserted in an intramedullary canal of the bone.

Figures 1, 2:
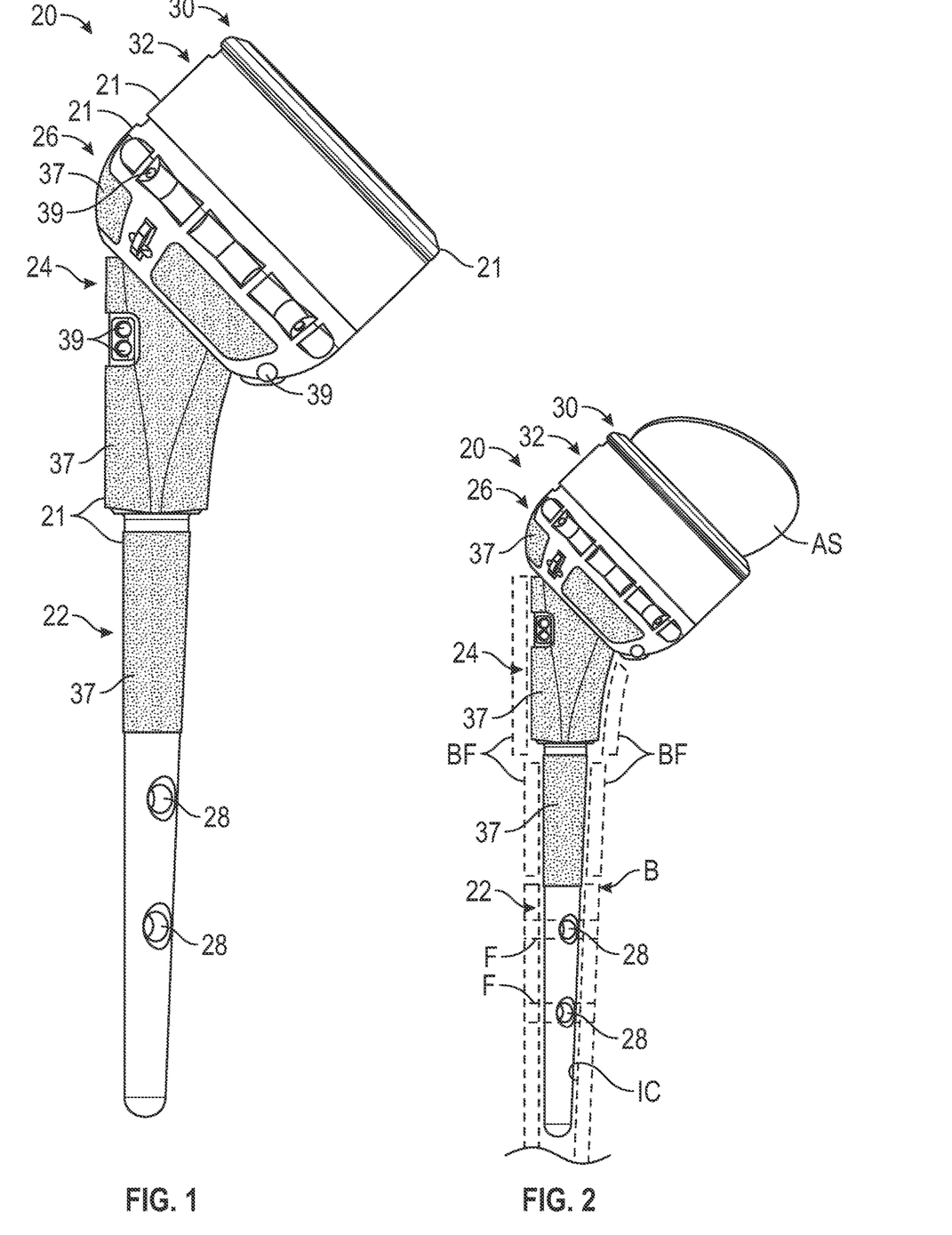
FIG. 1 discloses a perspective view of an implant system.
FIG. 2 discloses a perspective view of the implant system adjacent to an articular surface and secured to bone.

FIGS. 1 and 2 disclose an orthopaedic implant system (e.g., assembly) 20. The implant system 20 may be utilized in various orthopedic procedures to restore functionality to bones and/or joints such as a shoulder joint during an anatomical or reverse shoulder arthroplasty. The system 20 may be utilized to restore functionality to one or more bones in a fractured or shattered condition. The implant system 20 may be utilized to restore functionality to long bones and other bones such as a humerus or femur. The system 20 may be utilized to restore functionality to other bones and joints such as a knee, hip, elbow, wrist or ankle.

The implant system 20 may include one or more components 21. The components 21 may be fixedly attached or otherwise secured to each other to establish a modular implant. In implementations, one or more of the components 21 may be integrally formed with each other.

The components 21 of the implant system 20 may include a first (e.g., stem) component 22, a second (e.g., mounting) component 24 and/or a third (e.g., head or cup) component 26. In the implementation of FIG. 2, the stem component 22 may be insertable into bone B (shown in dashed lines). The stem component 22 may be at least partially inserted into a recess of the bone B, such as an intramedullary canal IC. One or more bone fragments BF may be positioned about a periphery of the mounting component 24 and/or stem component 22 (shown in dashed lines in FIG. 2). The stem component 22 may include one or more fixation bores 28. The fixation bores 28 may be dimensioned to receive respective fasteners F. The fasteners F may be dimensioned to extend through the bone B in an assembled (e.g., installed) position to secure the stem component 22.

Figure 4:
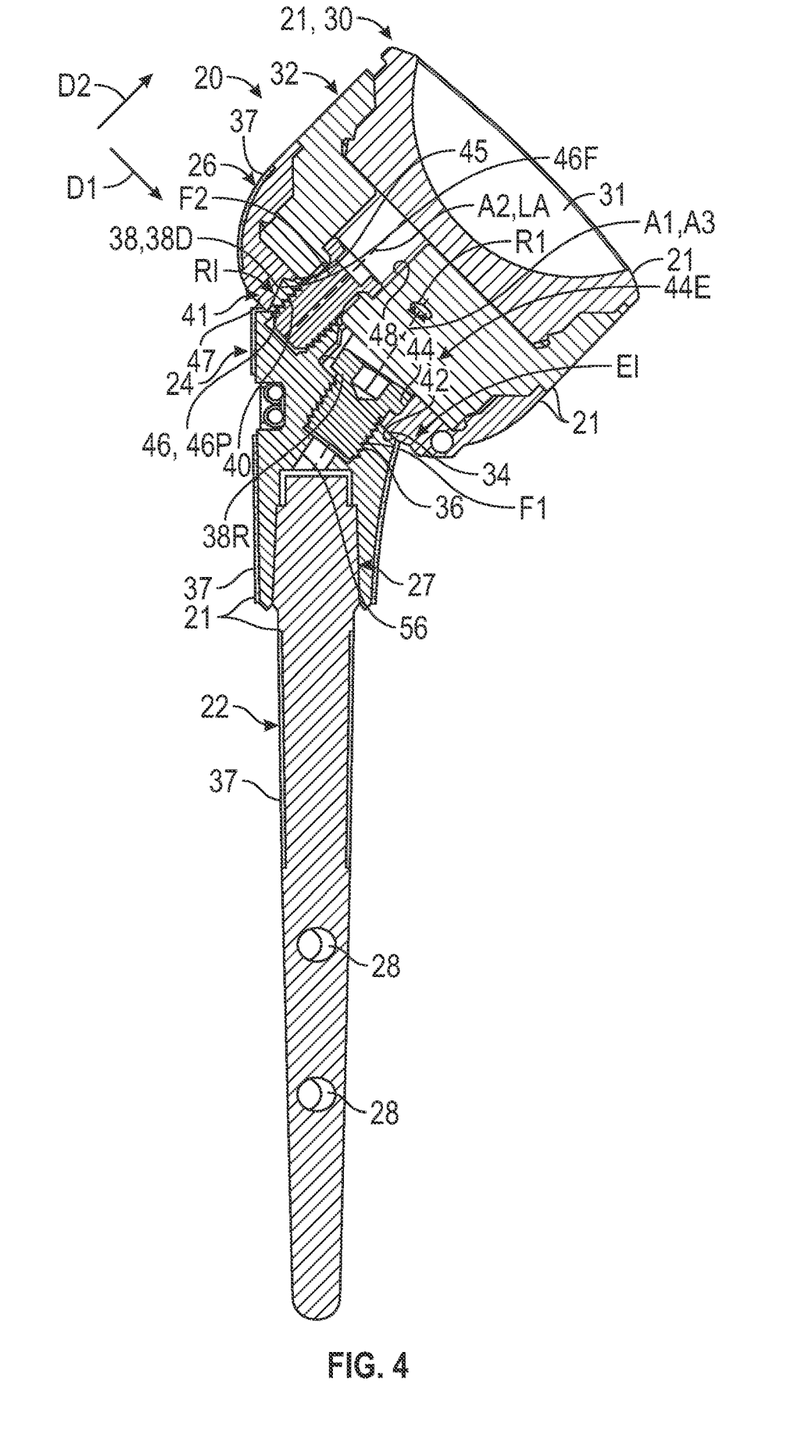
FIG. 4 discloses a sectional view of the implant system of FIG. 1.

The mounting component 24 may extend from, and may be coupled to, the stem component 22 utilizing various techniques. The stem component 22 and the mounting component 24 may be dimensioned to establish an interference fit. In the implementation of FIG. 4, the mounting component 24 may be coupled to the stem component 22 utilizing a (e.g., Morse) taper connection 27. The taper connection 27 may serve to limit relative axial and/or rotational movement between the stem component 22 and mounting component 24.

The head component 26 may be associated with an articulation surface 31 adapted to mate with an opposed the articular surface AS (FIGS. 2 and 4). The implant system 20 may include an articulation component (e.g., liner) 30. The articulation component 30 may include the articulation surface 31 (FIG. 4). The articulation surface 31 may have a generally concave geometry (e.g., FIG. 4) or a generally convex geometry. The articular surface AS may be established by an adjacent implant or an adjacent bone of an associated joint. The articular surface AS may have a generally convex geometry (e.g., FIG. 2) or a generally concave geometry. The head component 26 may be adapted to mount or otherwise secure the articulation member 30. The head component 26 may interconnect the stem component 22 and/or mounting component 24 with the articulation member 30.

The implant system 20 may include an adapter (e.g., spacer) component 32 adapted to interconnect or otherwise secure the head component 26 and articulation member 30 to each other. The implant system 20 may include a set of adapters 32 of various geometries to space apart and/or orient the head component 26 and the articulation member 30 relative to each other. In other implementations, the adapter 32 may be integrally formed with the head component 26 and/or articulation member 30. In implementations, the adapter 32 may be omitted. The articulation member 30 may be mounted or otherwise secured directly to the head component 26.

The implant system 20 may include various features to interact with surrounding bone or other tissue, including one or more surface treatment(s) 37. The surface treatments 37 may be established along one or more surfaces of the components 21. The surface treatments 37 may include a porous construct or scaffold established in a thickness of the component 21 or may be one or more porous layers of material disposed on a surface of the component 21 to promote fixation with adjacent bone or other tissue. The implant system 20 may include one or more passages (e.g., eyelets) 39. Each passage 39 may be dimensioned to receive a length of suture to secure bone and/or soft tissue to the implant system 20. In implementations, the surface treatments 37 and/or passages 39 may be omitted.

Figure 3:
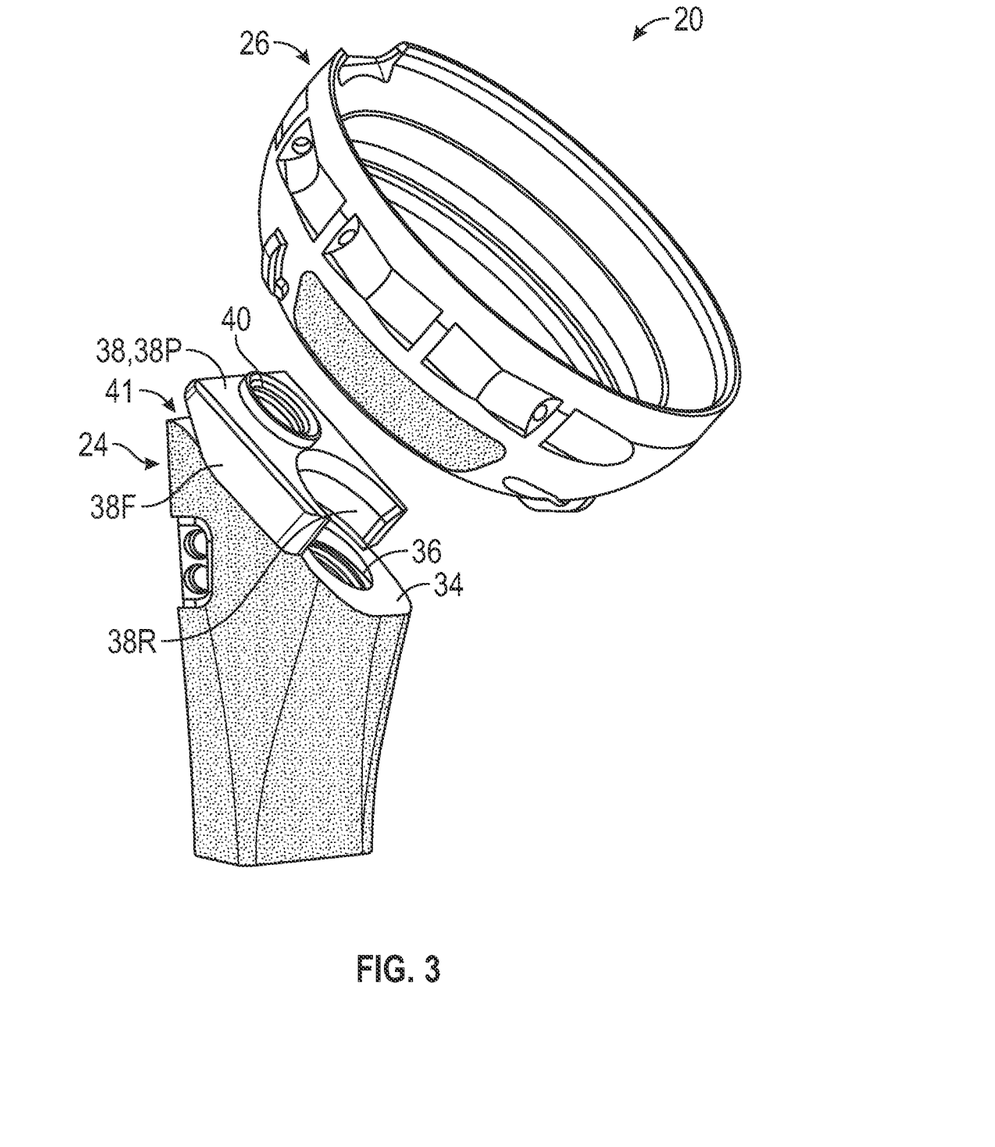
FIG. 3 discloses an exploded view of a mounting component and head component of the implant system of FIG. 1.

Referring to FIGS. 3 and 4, with continuing reference to FIGS. 1 and 2, the implant system 20 may include one or more features adapted to secure the components 21 to each other, such as the mounting component 24 and head component 26. The mounting component 24 may include a first engagement surface (e.g., face) 34, a first (e.g., mounting or coupling) bore 36 and a raised protrusion (e.g., boss) 38. The first engagement face 34 may be generally or substantially planar. For the purposes of this disclosure, the terms "about," "approximately" and "substantially" mean±10 percent of the stated value or relationship unless otherwise indicated. The first mounting bore 36 may be dimensioned to extend inwardly from the first engagement face 34.

The raised protrusion 38 may extend outwardly from the first engagement face 34. The raised protrusion 38 may be spaced apart from the first mounting bore 36 relative to the first engagement face 34. The raised protrusion 38 may include a second mounting bore 40. The second mounting bore 40 may be established along a proximal face 38P of the raised protrusion 38 (e.g., FIG. 3). The proximal face 38P may extend along a free end of the raised protrusion 38. In other implementations, the second mounting bore 40 may be omitted.

Referring to FIG. 4, with continuing reference to FIGS. 1-3, the head component 26 may include a second engagement surface (e.g., face) 42 dimensioned to engage the first engagement face 34. The second engagement face 42 may be generally or substantially planar. The first engagement face 34 and second engagement face 42 may be dimensioned to mate with, or otherwise contact, each other to establish an engagement interface EI between the first engagement face 34 and second engagement face 42 in the assembled position. The second engagement face 42 may be dimensioned to sit on the first engagement face 34 in the assembled position.

The head component 26 may include a head bore 44 and a recess 46. The head bore 44 and recess 46 may be spaced apart from each other relative to the second engagement face 42 of the head component 26. The head bore 44 and recess 46 may be dimensioned to extend inwardly from the second engagement face 42. The adapter 32 and/or articulation member 30 may be dimensioned to completely, or at least partially, block an opening (e.g., entrance) 44E of the head bore 44 in the assembled position.

The first mounting bore 36 may be dimensioned to extend along a first (e.g., mounting bore) axis A1. The second mounting bore 40 of the raised protrusion 38 may be dimensioned to extend along a second (e.g., mounting bore) axis A2. A longitudinal axis LA of the raised protrusion 38 may coincide with, or may otherwise be substantially parallel to, the second mounting bore axis A2. In other implementations, the second mounting bore axis A2 and longitudinal axis LA may be transverse to each other. The head bore 44 of the head component 26 may be dimensioned to extend along a head bore axis A3.

The first mounting bore 36 and the head bore 44 may be dimensioned to receive a first (e.g., common) fastener F1 to secure the mounting component 24 and head component 26 to each other in the assembled position. Various fasteners may be utilized to secure any of the components of the implant systems disclosed herein, including threaded bolts, pins, rivets, clips, etc. The mounting bore axis A1 and the head bore axis A3 may be misaligned prior to securing the fastener F1 (e.g., FIG. 5) and may be substantially aligned in response to securing the fastener F1 (e.g., FIG. 7). The first mounting bore axis A1 and the head bore axis A3 may be substantially aligned with each other along engagement interface EI to receive the fastener F1 in the assembled position.

The adapter 32 may include an adapter (e.g., spacer) bore 48 for securing the adapter 32 and mounting component 24 to each other. The head component 26 may include a second head bore 45. The second mounting bore 40, second head bore 45 and adapter bore 48 may be dimensioned to receive a second (e.g., common) fastener F2 in the assembled position. The second mounting bore 40, second head bore 45 and adapter bore 48 may be substantially aligned with each other along the second mounting bore axis A2 to receive the common fastener F2 to secure the adapter 32 and mounting component 24 to each other in the assembled position. The fastener F2 may be secured in the second mounting bore 40, second head bore 45 and adapter bore 48 subsequent to securing the fastener F1 in the first mounting bore 36 and head bore 44. The mounting bore axis A2 and the longitudinal axis LA may be misaligned prior to securing the fastener F2 (e.g., FIG. 5) and may be substantially aligned in response to securing the fastener F2 (e.g., FIG. 4).

The mounting component 24 and head component 26 may cooperate to establish a taper locking mechanism for improving fixation of the head component 26. The raised protrusion 38 of the mounting component 24 and the recess 46 of the head component 26 may be dimensioned to establish the taper locking mechanism. The raised protrusion 38 may include a first (e.g., declined) face 38D dimensioned to contact the head component 26. The declined face 38D may be established along a periphery of the raised protrusion 38. The raised protrusion 38 may be dimensioned to taper along the declined face 38D from a proximal face (e.g., free end) 38P of the raised protrusion 38 toward the first engagement face 34 such that a cross-sectional area of the raised protrusion 38 may decrease in a direction from the proximal face 38P to establish a generally wedge-shaped engagement recess 41.

The head component 26 may include a second (e.g., inclined) face 46F dimensioned to engage the declined face 38D of the raised protrusion 38 in the assembled position. The inclined face 46F may be established by a wall of the head component 26. In implementations, the inclined face 46F may extend along and bound a periphery 46P of the recess 46. The head component 26 may include a generally-wedge shaped engagement lip 47 that may establish a component of the periphery 46P of the recess 46. The engagement lip 47 may be dimensioned to be at least partially received in the engagement recess 41. In implementations, the engagement recess 41 may be dimensioned to substantially follow a contour of the engagement lip 47 such that the engagement lip 47 may be wedged against the declined face 38D in the assembled position.

The raised protrusion 38 may be insertable through an opening and into the recess 46 such that the declined face 38D and the inclined face 46F may abut each other to establish a ramped interface RI in the assembled position. The ramped interface RI may be separate and distinct from the engagement interface EI.

The raised protrusion 38 and the recess 46 of the head component 26 may be dimensioned such that the inclined face 46F may bind or compress against the declined face 38D in response to at least partially or completely securing the fastener F1 in the first mounting bore 36 and the head bore 44. The first mounting bore 36 may be dimensioned to extend along the first mounting bore axis A1 in a direction away from the raised protrusion 38 such that the inclined face 46F may move in a first direction D1 (e.g., sideways) towards the first mounting bore axis A1 to cause the inclined face 46F to bind or compress against the declined face 38D in response to securing the common fastener F1. In implementations, the second engagement face 42 of the head component 26 may be dimensioned to slide in the first direction D1 across the first engagement face 34 in response to rotation of the common fastener F1 in a first rotational direction R1 about the first mounting bore axis A1 such that the common fastener F1 may translate along the first mounting bore axis A1. In implementations, the first direction D1 may be substantially perpendicular or otherwise transverse to the second mounting bore axis A2 of the second mounting bore 40. The first direction D1 may be oblique to the first mounting bore axis A1 of the first mounting bore 36. The head component 26 may be dimensioned to capture the raised protrusion 38 in the recess 46 to limit movement of the head portion 26 in a second direction D2 away from the mounting portion 24 in the assembled position.

Figure 5:
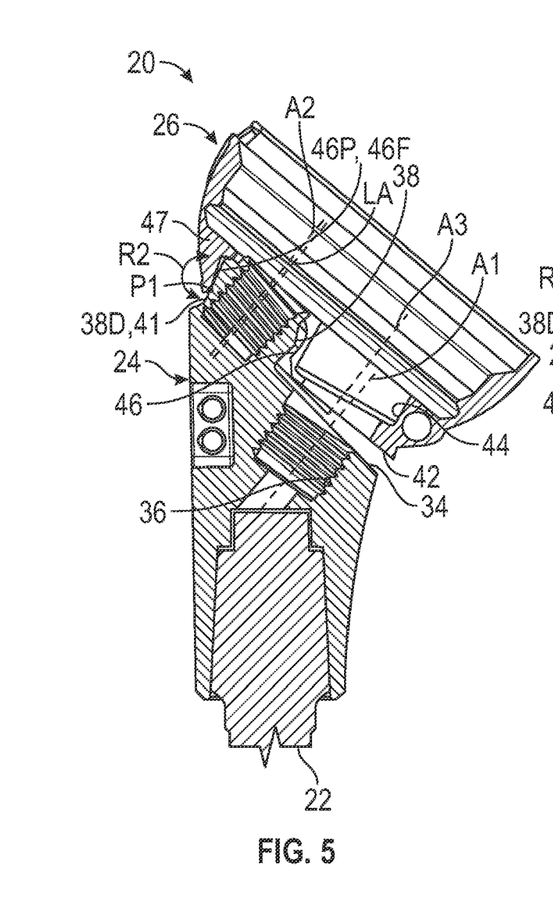
FIG. 5 discloses a sectional view of the head component at an intermediate position relative to the mounting component.
Figure 6:
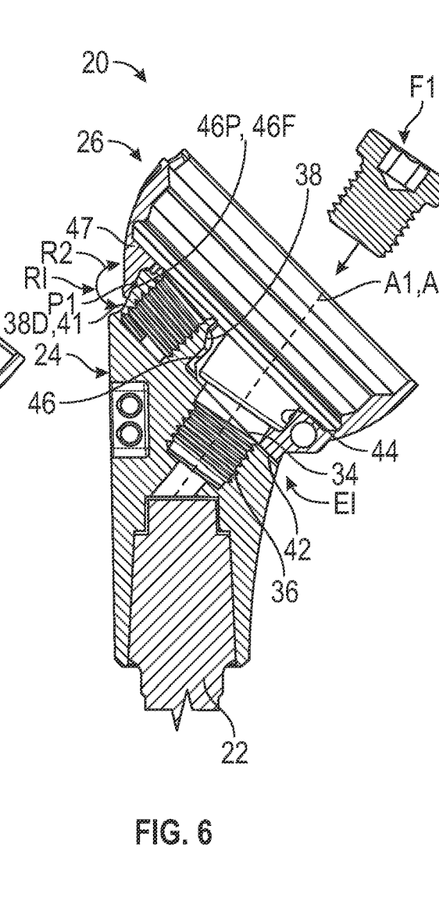
FIG. 6 discloses a sectional view of the head component at a second position relative to the mounting component.

Referring to FIG. 5, with continuing reference to FIG. 4, a pivot (e.g., hinge) point P1 may be established between the periphery 46P of the recess 46 and the declined face 38D of the raised protrusion 38 at a first position. Referring to FIG. 6, with continuing reference to FIGS. 4-5, the head portion 26 may be progressively pivoted in a rotational direction R2 about the pivot point P1 towards the mounting portion 24 such that the raised protrusion 38 may pass through the opening of the recess 46 and may be at least partially captured in the recess 46.

Referring to FIG. 6, with continuing reference to FIGS. 4-5, the head portion 26 may be pivoted in the rotational direction R2 about the pivot point P1 such that the first engagement face 34 and the second engagement face 42 may abut against each other in a second position. The axis A3 of the head bore 44 may be misaligned with the axis A1 of the first mounting bore 36 during the pivoting of the head portion 26 in the rotational direction R1 (see, e.g., FIG. 10) until the first engagement face 34 and the second engagement face 42 abut against each other in the second position. The axis A3 of the head bore 44 may be substantially aligned with the axis A1 of the first mounting bore 36 in the second position. The second engagement face 42 of the head portion 26 may be seated on the first engagement face 34 of the mounting portion 24 in the second position.

Figure 7:
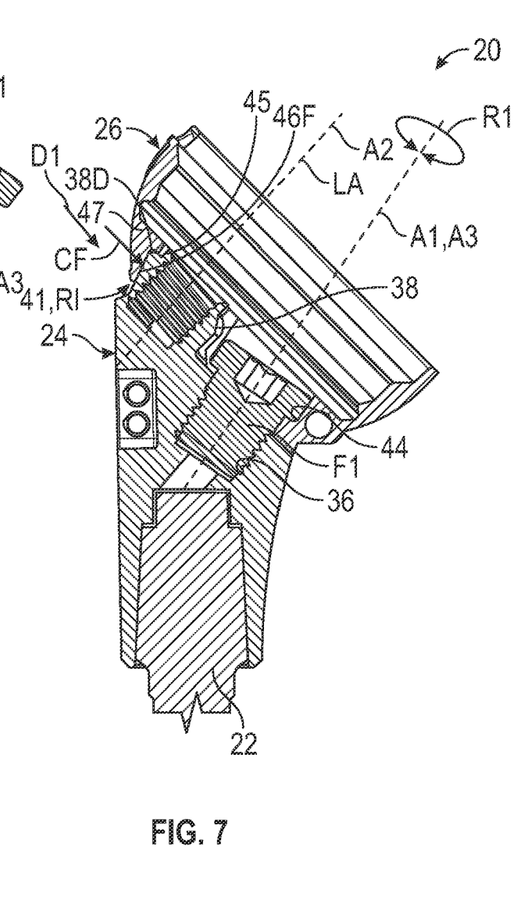
FIG. 7 discloses a sectional view of the head component coupled to the mounting component at the second position with a fastener.

Referring to FIG. 7, with continuing reference to FIGS. 4-6, the mounting portion 24 and head portion 26 may be secured to each other with the fastener F1. The fastener F1 may be positioned through the head bore 44 and then into the first mounting bore 36 of the mounting portion 24. The fastener F1 may be rotatable in the rotational direction R1 about the first mounting bore axis A1 of the first mounting bore 36 to thread the fastener F1 into the first mounting bore 36. Securing the mounting portion 24 and head portion 26 with the fastener F1 may cause the head portion 26 to move in the direction D1 across the mounting portion 24 to bind or compress the inclined face 46F of the recess 46 against the declined face 38D of the raised protrusion 38 to lock the mounting portion 24 and head portion 26 to each other in the assembled position. Securing the fastener F1 may occur such that the inclined face 46F may apply a compressive force (e.g., load) CF against the declined face 38D along the ramped interface RI. The compressive force CF may have a major component in a direction that may be substantially perpendicular to the longitudinal axis LA of the raised protrusion 38. The compressive force CF may be substantially parallel to the direction D1.

Figure 8:
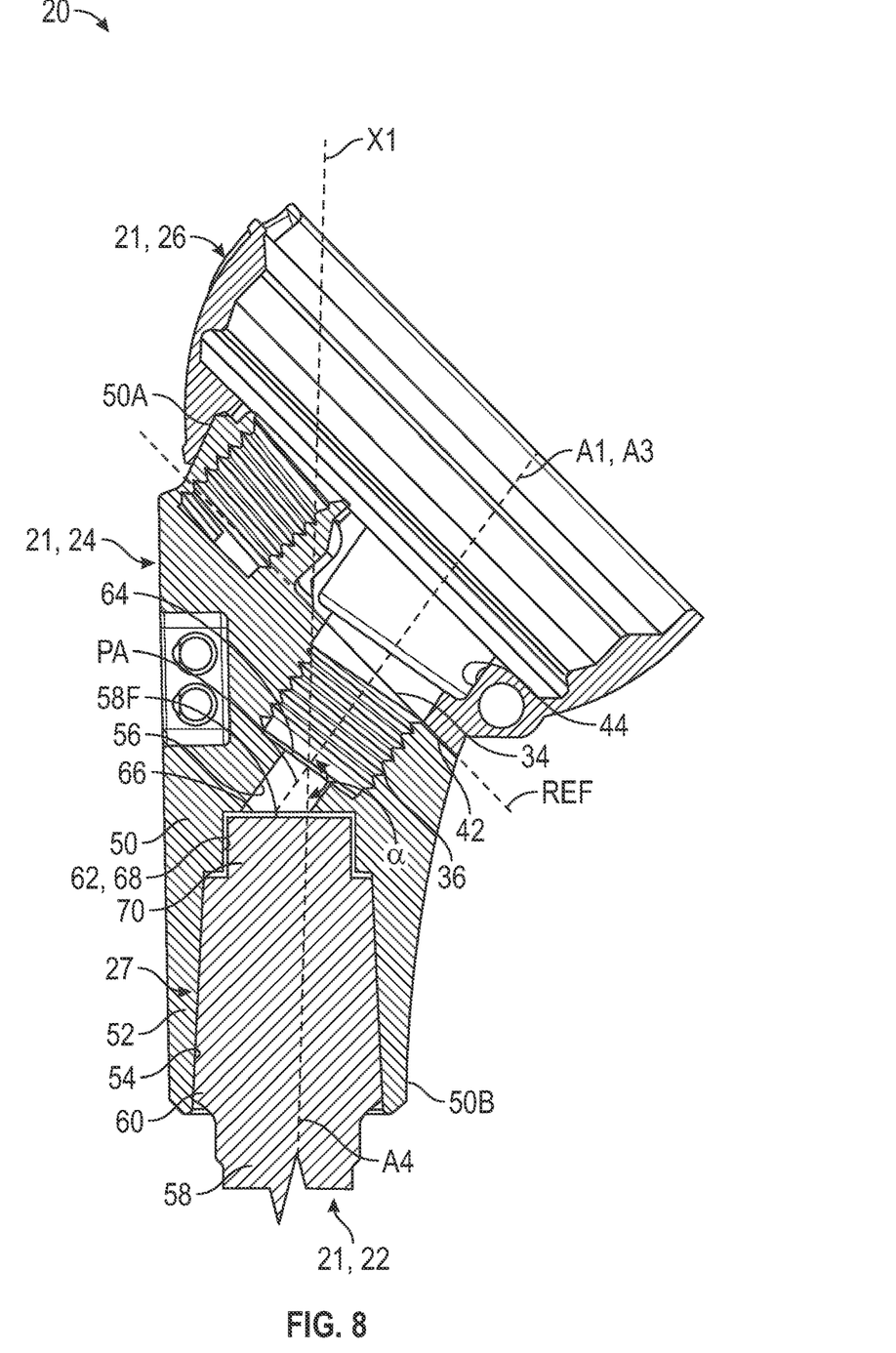
FIG. 8 discloses a sectional view of the implant system of FIG. 1.

Referring FIG. 8, with continuing reference to FIGS. 4-7, the assembly 20 may include one or more features that may facilitate disassembly of one more of the components 21 from each other, such as the taper connection 27 between a first component 21 and a second component 21. In implementations, the first component 21 may be the mounting component 24 and the second component 21 may be the stem component 22, or vice versa. The head component 26 may be adapted to mount the articulation component 30 establishing the articulation surface 31 (see, e.g., FIG. 4). The stem component 22 may be insertable in bone, including any of the bones disclosed herein (e.g., FIG. 2). In implementations, the bone may be a humerus or another long bone of the patient.

The mounting component 24 may include a mounting body 50. The mounting body 50 may include a (e.g., first) tapered portion 52. In implementations, the tapered portion 52 may include a (e.g., tapered) recess 54. The tapered recess 54 may be dimensioned to at least partially receive a portion of the stem component 22.

The mounting bore 36 may be dimensioned to extend from the engagement face 34. The mounting bore 36 may be dimensioned to receive the fastener F1 for securing a third component 21, such as the head component 26, along the engagement face 34 (see, e.g., FIG. 4). The mounting bore 36 may be transverse to the first tapered portion 52. The tapered recess 54 may extend along a fourth (e.g., recess) axis A4. The mounting bore 36 may extend along the mounting bore axis A1. The mounting bore axis A1 may be transverse to the recess axis A4. The mounting bore axis A1 and recess axis A4 may define a first angle α. The first angle α may be equal to or greater than 90 degrees. In implementations, the first angle α may be between approximately 110 degrees and approximately 160 degrees, such as approximately 135 degrees.

The stem component 22 may include a component body 58. The component body 58 may include a second tapered portion 60. The second tapered portion 60 may be dimensioned to cooperate with the first tapered portion 52 to establish the taper connection 27. The first tapered portion 52 and the second tapered portion 60 may engage each other to establish the taper connection 27. In implementations, the first tapered portion 52 of the mounting component 24 may include a female taper. The tapered recess 54 may establish the female taper. The second tapered portion 60 of the stem component 22 may include a male taper dimensioned to engage the female taper to establish the taper connection 27. In implementations, the second tapered portion 60 may be at least partially or completely insertable in the tapered recess 54 to establish the taper connection 27. In other implementations, the first tapered portion 52 may include the male taper. The second tapered portion 60 may include the female taper.

The mounting component 24 may include one or more fluid passages dimensioned to convey fluid through the mounting body 50 to the tapered recess 54. The mounting body 50 may include a fluid passage 56. The mounting bore 36 and/or fluid passage 56 may be established in a female side of the taper connection 37 (e.g., FIG. 4). In other implementations, the mounting bore 36 and/or fluid passage 56 may be established in a male side of the taper connection 37. The fluid passage 56 may be dimensioned to communicate fluid to the tapered recess 54. The fluid passage 56 may be dimensioned to interconnect the tapered recess 54 and the mounting bore 36. The head bore 44 and the mounting bore 36 may be dimensioned to receive the fastener F1 to attach the head component 26 and the mounting component 24 to each other such that the fastener F1 may block access to the fluid passage 56 (see, e.g., FIG. 4). Various fluids may be utilized, including biologically compatible fluids such as saline, water, blood, etc. The fluid may have various viscosities to facilitate pressurization of the tapered recess 54 and/or fluid passage 56.

The tapered recess 54 may include a localized cavity 62. The localized cavity 62 may be pressurized with fluid to release the tapered connection 27. The second tapered portion 60 may be dimensioned to engage or otherwise cooperate with the first tapered portion 52 to establish the localized cavity 62. The second tapered portion 60 and surfaces of the mounting body 50 bounding the tapered recess 54, such as the first tapered portion 52, may cooperate to define the localized cavity 62 in response to establishing the taper connection 27. In implementations, a volume of the localized cavity 62 may be less than approximately 25 percent of a total volume of the tapered recess 54, or more narrowly between approximately 2 percent and approximately 10 percent of the total volume.

The fluid passage 56 may be transverse to the first tapered portion 52. The fluid passage 56 may be transverse to the recess axis A4 of the tapered recess 54 and/or a first longitudinal axis X1 of the mounting body 50. The fluid passage 56 may be dimensioned to extend along the mounting bore axis A1. A passage axis PA of the fluid passage 56 may be oriented at a perpendicular or oblique angle relative to the recess axis A4. The passage axis PA may be substantially collinear with or otherwise parallel to the mounting bore axis A1. In implementations, the oblique angle may be the first angle α or may be a different angle. Utilizing the techniques disclosed herein, an overall volume for receiving fluid may be increased as compared to the localized cavity 62 alone in a relatively compact arrangement may be established by the oblique orientation of the fluid passage 56 and/or mounting bore 36.

The fluid passage 56 may interconnect the localized cavity 62 and the mounting bore 36. The volume of the localized cavity 62A may be less than a combined volume of the mounting bore 36 and the fluid passage 56. In implementations, the volume of the localized cavity 62 may be less than approximately 25 percent of the combined volume of the mounting bore 36 and the fluid passage 56, or more narrowly less than approximately 10 percent of the combined volume.

The mounting body 50 may extend along the first longitudinal axis X1 between a first end 50A and a second end 50B. The tapered recess 54 may extend inwardly from the second end 50B. The engagement face 34 may be dimensioned to extend along a reference plane REF. The reference plane REF may be oblique to the longitudinal axis X1. The axis A4 of the tapered recess 54 may be collinear with or otherwise substantially parallel to the longitudinal axis X1.

The fluid passage 56 may be dimensioned to extend along the passage axis PA between a first fluid (e.g., inlet) port 64 and a second fluid (e.g., outlet) port 66. The first fluid port 64 may interconnect the mounting bore 36 and the fluid passage 56. The second fluid port 66 may interconnect the second recess 68 and the fluid passage 56. The mounting bore 36 may be dimensioned to widen from the first fluid port 64. The first fluid port 64 may be established at an oblique angle relative to the longitudinal axis X1 of the mounting body 50. The second fluid port 66 may be established along the axis A4 of the tapered recess 54 and/or the longitudinal axis X1 of the mounting body 50. The second fluid port 66 may be substantially perpendicular to the axis A4 and/or the longitudinal axis X1.

The mounting body 50 may define a second recess 68 between the tapered recess 54 and the fluid passage 56. The second recess 68 may be dimensioned to widen from the second fluid port 66. The tapered recess 54 may be dimensioned to widen from the second recess 68.

The stem component 22 may include a protrusion 70 extending outwardly from the second tapered portion 60 to a free end 58F of the component body 58. The protrusion 70 may have a substantially cylindrical geometry. A maximum diameter of the protrusion 70 may be less than a minimum diameter of the second recess 68 of the stem component 22. The protrusion 70 and the tapered portion 60 may be dimensioned to establish a step-shaped geometry. The protrusion 70 may be at least partially or completely insertable in the second recess 68 to establish the localized cavity 62. The localized cavity 62 may extend about a periphery of the protrusion 70. In other implementations, the tapered recess 54 may extend directly from the fluid passage 56 to establish the localized cavity 62.

Figure 9:
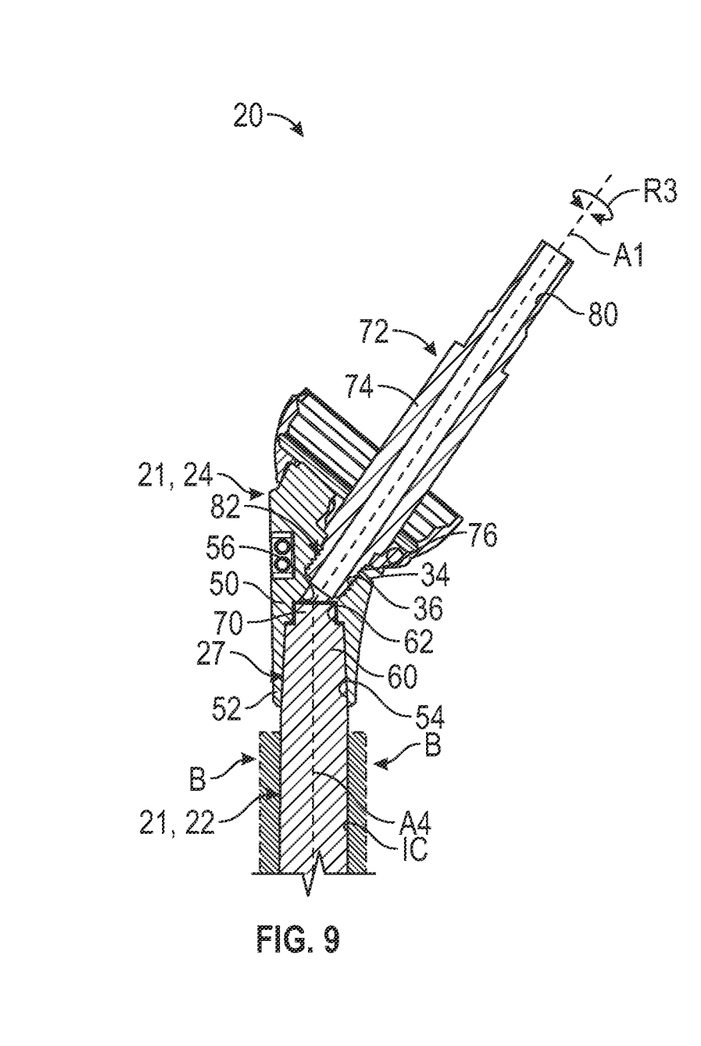
FIG. 9 discloses an actuation device coupled to a component of the implant system.
Figure 10:
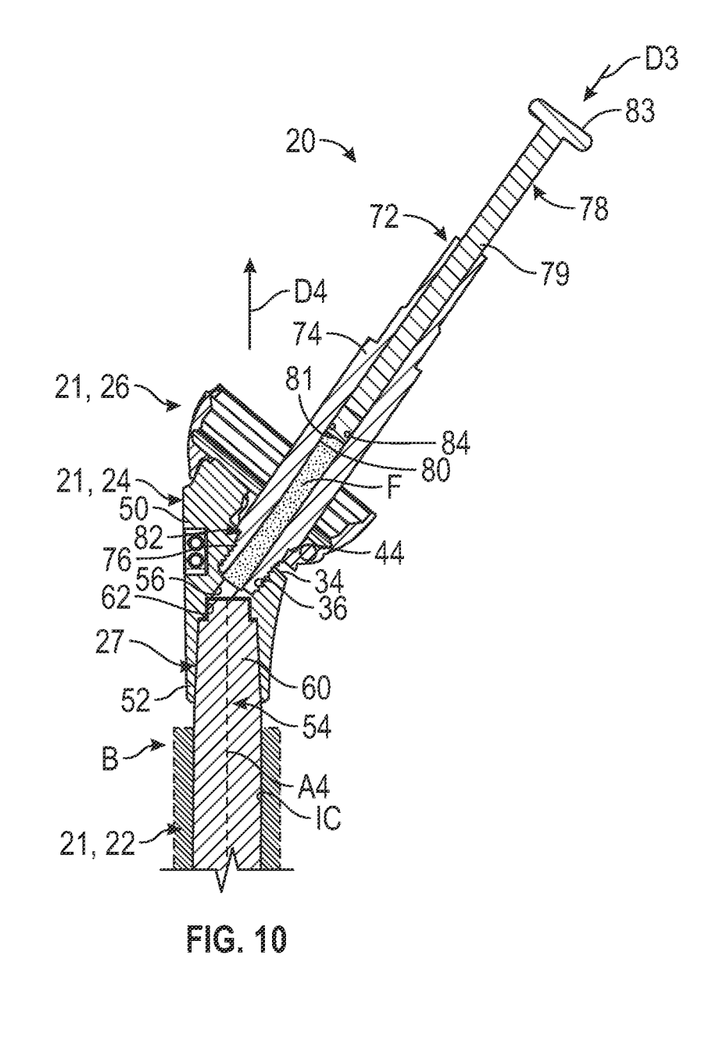
FIG. 10 discloses the actuation device of FIG. 9 including an actuation device.

Referring to FIGS. 9-10, with continuing reference to FIG. 8, the assembly 20 may include an actuation device (e.g., hydraulic taper separator) 72 adapted to selectively cause separation of taper connections, such as the tapered connection 27. In implementations, the actuation device 72 may be a hydraulic pump. The actuation device 72 may include an actuation (e.g., pump) body 74 and an interface portion 76. The interface portion 76 may be dimensioned to engage the mounting bore 36. In implementations, the interface portion 76 may be releasably securable to the mounting bore 36 at a threaded connection 82. In implementations, the actuation body 74 may be rotatable in a third rotational direction R3 about the mounting bore axis A1 to establish the threaded connection 82 (e.g., FIG. 9). Other techniques may be utilized to fluidly couple the actuation device 72 to the mounting component 24, such as a press fit connection which may include one or more seals.

Referring to FIG. 10, with continuing reference to FIGS. 8-9, the actuation device 72 may be adapted to selectively communicate an amount of fluid F through the fluid passage 56 to cause separation of the taper connection 27. The actuation device 72 may include an actuator (e.g., plunger) 78 insertable in a cavity 80 of the actuation body 74. The actuation device 72 may be adapted to communicate fluid F through the mounting bore 36 to cause separation of the taper connection 27 in response to pressurizing the localized cavity 62. In implementations, the actuator 78 may be movable in a third direction D3 to cause pressurization of the localized cavity 62 and/or portions of the tapered recess 54. The actuator 78 may serve as a piston for pressurizing the fluid.

Figure 11:
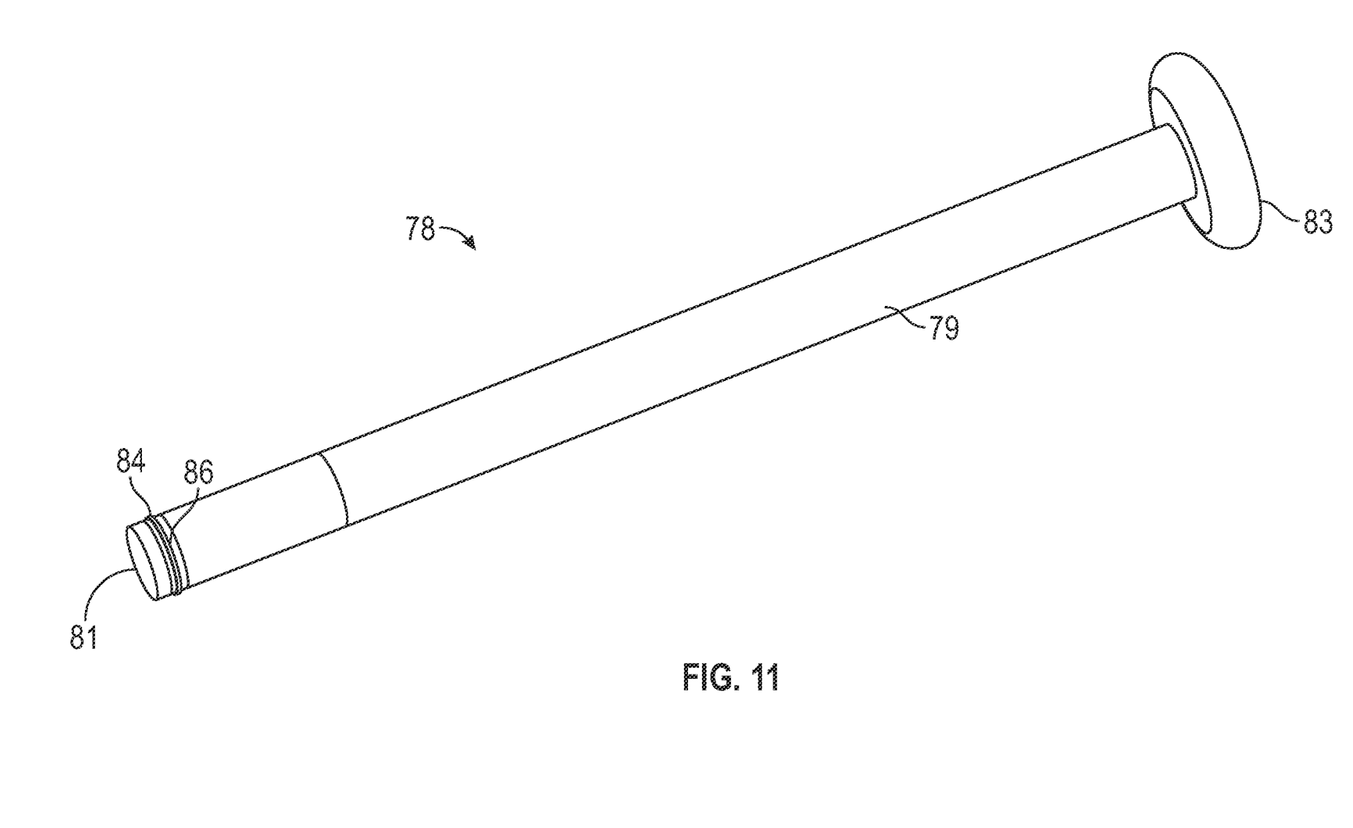
FIG. 11 discloses an implementation of an actuator of the actuation device of FIG. 10.

Referring to FIG. 11, with continuing reference to FIG. 10, the actuator 78 may include a main body 79 extending between a first (e.g., distal) end 81 and a second (e.g., proximal) end 83. The main body 79 may be dimensioned such that the distal end 81 may be insertable in the cavity 80 of the actuation body 74. The distal end 81 may cause pressurization of fluid F in the cavity 80 in response to movement of the actuator 78 in the third direction D3. The actuation device 72 may include at least one, or more than one, seal 84. Each seal 84 may be adapted to establish a sealing relationship between the actuator 78 and surfaces of the actuation body 74 bounding the cavity 80. The sealing relationship may block or otherwise limit flow of fluid F past the seal 84, which may improve pressurization. The seal 84 may include various materials, including metallic and/or non-metallic materials such as an elastomer. The seal 84 may include various configurations, such as a ring seal. The actuator 78 may be dimensioned to carry the seal 84. The seal 84 may be arranged adjacent to the distal end 81 of the actuator 78. In implementations, the main body 79 of the actuator 78 may include an annular groove 86 established along an outer periphery of the main body 79. The groove 86 may be dimensioned to at least partially receive the seal 84.

Figure 12:
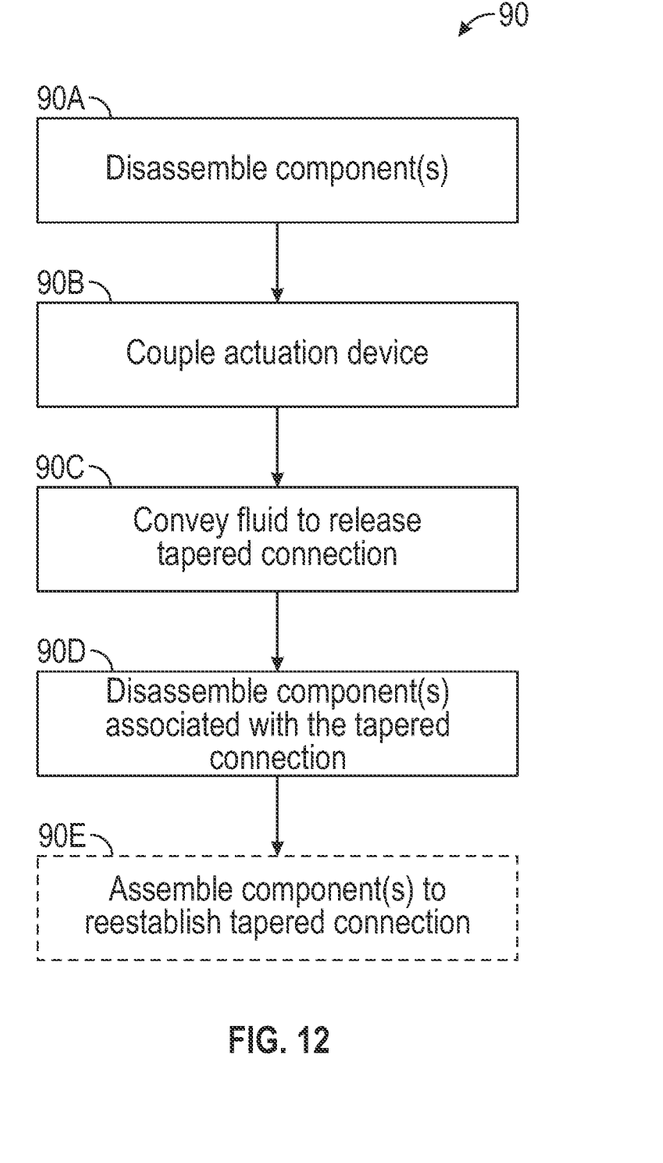
FIG. 12 discloses a method of disassembling an orthopaedic component according to an implementation.

FIG. 12 discloses a method of disassembling component(s) of an orthopaedic implant system in a flow chart 90 according to an implementation. The method 90 may be utilized to perform an arthroplasty to restore functionality to a bone and/or joint, including any of the bones and joints disclosed herein. Method 90 may be utilized preoperatively, postoperatively and/or intraoperatively to reconfigure, replace and/or remove a component implanted during surgery. The surgeon may disassemble the component and may reassemble the same component (e.g., in another orientation, etc.) or may select another component to implant in the patient. Method 90 may be utilized in a revision surgery in which one or more previously implanted components may be replaced. Method 90 may be utilized in repair of a humerus or other long bone. Method 90 may be utilized in an anatomical shoulder or reverse shoulder arthroplasty. Method 90 may be utilized in accordance with any of the implant systems disclosed herein, including the implant system 20 and/or implant system 120 (FIG. 12). Fewer or additional steps than are recited below could be performed within the scope of this disclosure, and the recited order of steps is not intended to limit this disclosure. Reference is made to the implant system 20.

The disclosed implant system 20 may be provided to the surgeon as a surgical kit. The kit may include components of various shapes and sizes. The particular components may be selected from the kit to establish a specified configuration of the implant system 20 according to an anatomy of the patient and/or aspects of a surgical plan.

Referring to FIGS. 2 and 4, with continuing reference to FIG. 12, at step 90A one or more components 21 of the system 20 may be disassembled from each other. The components 21 may be in situ. The components 21 may include any of the components disclosed herein, such as a stem component 22, a mounting component 24 and/or a head component 26. The stem component 22 may be at least partially inserted into a recess of a bone B, such as an intramedullary canal IC.

In implementations, step 90A may include disassembling the head component 26 and the mounting component 24 from each other (see, e.g., FIG. 9). The head component 26 may be removed from the mounting component 24 in an opposite order of the step(s) to assemble the head component 26 to the mounting component 24 (see, e.g., FIGS. 5-7). Removing the head component 26 from the mounting component 24 may include removing the fastener F1 from the mounting bore 36 that may secure the head component 26 and the mounting component 24 to each other (see, e.g., FIG. 6).

Referring to FIG. 9, with continuing reference to FIG. 12, at step 90B the actuation device 72 may be fluidly coupled to the mounting bore 36 and/or another portion of the system 20. The actuation device 72 may be coupled to the components 21 of the system 20 utilizing any of the techniques disclosed herein. In the implementation of FIG. 10, the head component 26 may remain assembled to the mounting component 24 when the actuation device 72 is secured to the mounting component 24. The actuation body 74 may be dimensioned to extend through the head bore 44 of the head component 26 to engage the mounting bore 36.

Referring to FIG. 10, with continuing reference to FIG. 12, at step 90C an amount of (e.g., biologically compatible) fluid F may be conveyed from the coupled actuation device 72 to release the tapered connection 27 in response to pressurizing the localized cavity 62 and/or portions of the tapered recess 54. The actuation device 72 may be at least partially filled with the fluid F. Step 90C may include impacting the actuator 78 in the direction D3 to cause the fluid F to flow from the cavity 80 to the localized cavity 62 of the mounting component 24. In implementations, the actuator 78 may be impacted with a mallet or other instrument. The actuator 78 may be impacted to cause a relatively large impulse of pressure, which may improve separation of the tapered connection 27.

Step 90C may include conveying the fluid F through the fluid passage 56 toward the localized cavity 62 in a direction transverse to the fourth axis A4 of the tapered recess 54. In implementations, step 90C may include conveying the fluid F in substantially the third direction D3, which may be transverse to the fourth axis A4. The actuation device 72 may be uncoupled from the mounting component 24 subsequent to releasing the tapered connection 27.

At step 90D, one or more components 21 associated with the tapered connection 27 may be disassembled from each other. Step 90D may include separating the components 21 from each other in response to releasing the taper connection 27. Step 90D may include disassembling the mounting component 22 and the stem component 22 from each other. Step 90D may include removing the mounting component 22 from the surgical site. Step 90D may include moving the mounting component 22 in a fourth direction D4 away from the stem component 22, which may be substantially parallel to the axis A4 of the stem component 22. The stem component 22 may remain in situ or may be removed from the patient. The stem component 22 may be a single component or may include two or more components securable to each other.

At step 90E, one or more components 21 may be assembled and/or reassembled to reestablish the tapered connection 27. In implementations, another component 21 such as another mounting component 24 may be assembled to the stem component 22 to reestablish the tapered connection 27. The surgeon may select a mounting component 24 having a different geometry (e.g., shape, size, etc.) than the previously assembled mounting component 24.

Figure 13:
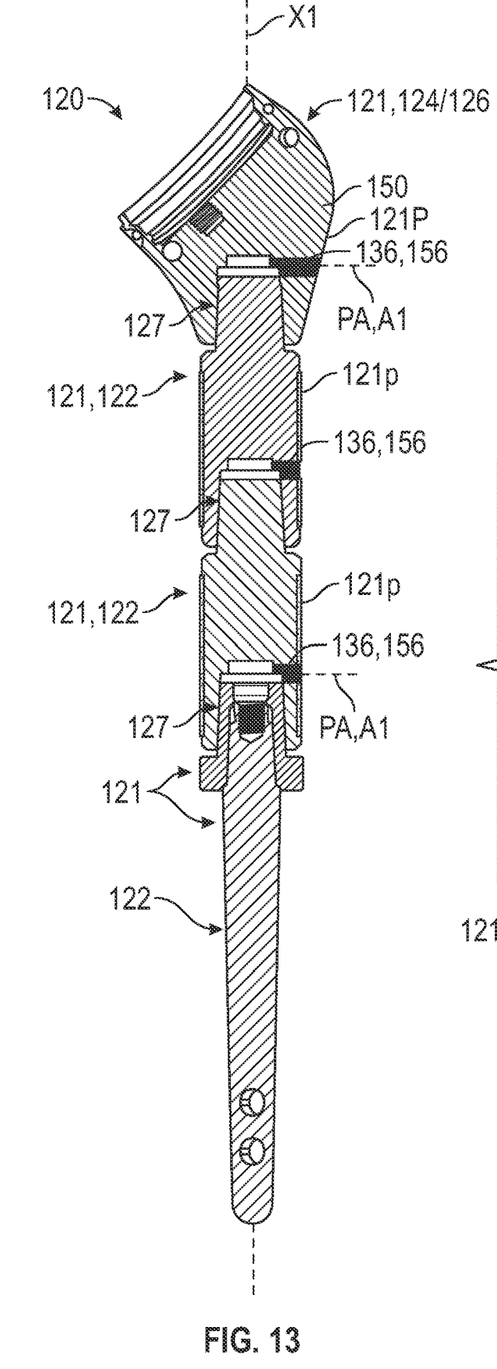
FIG. 13 discloses an orthopaedic implant system according to another implementation.

FIG. 13 discloses an orthopaedic implant system (e.g., assembly) 120 according to another implementation. The implant system 120 may include one or more components 121. The components 121 may be fixedly attached or otherwise secured to each other to establish a modular implant. In implementations, one or more of the components 121 may be integrally formed with each other.

The components 121 of the implant system 120 may include one or more stem components 122, a mounting component 124 and/or a head (e.g., cup) component 126. In the implementation of FIG. 13, the mounting component 124 and the head component 126 may be integrally formed with each other. In other implementations, the mounting component 124 and the head component 126 may be separate components (e.g., FIGS. 3-4). Adjacent components 121 may be coupled to each other utilizing a (e.g., Morse) taper connection 127. One or more of the components 121 may include a respective (e.g., mounting or coupling) bore 136. The coupling bore 136 may extend inwardly from an outer periphery 121P of the component 121. The outer periphery 121P may be established between opposite (e.g., first and second, or proximal and distal) ends of the component 121. The taper connection 127 may be established adjacent to the mounting bore 136.

Figure 14:
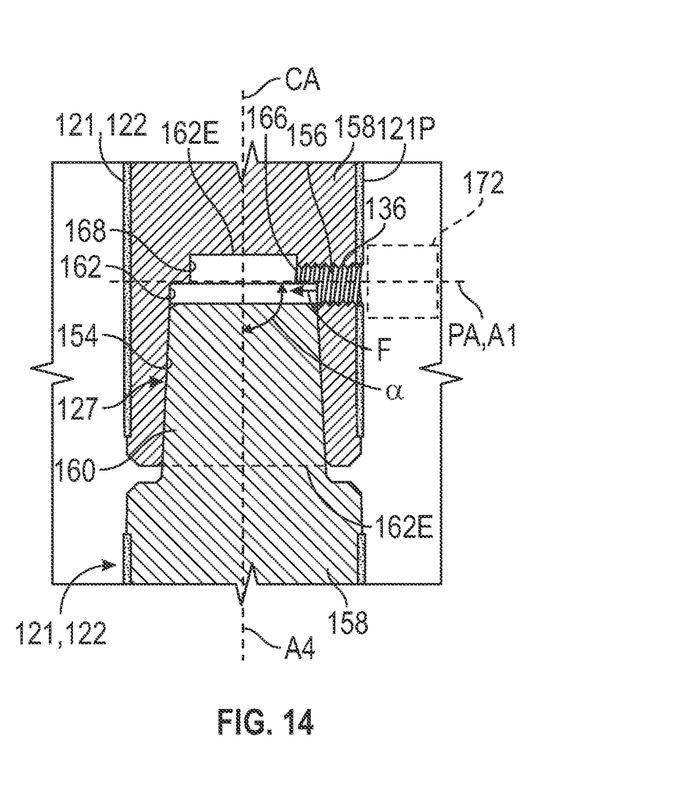
FIG. 14 discloses aspects of the implant system of FIG. 13.

Referring to FIG. 14, with continuing reference to FIG. 13, one or more of the components 121 may include a tapered recess 154. The tapered recess 154 may include a localized cavity 162. One or more of the components 121 may include a respective fluid passage 156. The fluid passage 156 may extend from, or may otherwise be dimensioned to fluidly communicate with, the localized cavity 162. In implementations, the fluid passage 156 may be established along and/or may extend from the coupling bore 136. The fluid passage 156 may be coupled to a fluid (e.g., outlet) port 166 established along a surface bounding the localized cavity 162.

The component 121 may extend along a component (e.g., longitudinal) axis CA. The tapered recess 154 may extend along a fourth (e.g., recess) axis A4. In implementations, the fourth axis A4 and component axis CA may be substantially collinear or otherwise parallel to each other. In other implementations, the recess axis A4 and component axis CA may be transverse to each other. The fluid port 166 may be established at various positions along the localized cavity 162. In implementations, the fluid port 166 may be spaced apart from both ends 162E of the localized cavity 162.

The coupling bore 136 may extend along a bore axis A1. The fluid passage 156 may extend along a passage axis PA. The bore axis A1 and/or the passage axis PA may be transverse to the component axis CA and/or recess axis A4. The bore axis A1 and/or the passage axis PA may define a first angle α relative to the recess axis A4. The mounting bore 136 and/or fluid passage 156 may be transverse to the recess axis A4 and/or component axis CA. In implementations, the first angle α may be less than approximately 135 degrees, or more narrowly greater than approximately 45 degrees. The first angle α may be approximately 90 degrees such that the coupling bore 136 and/or fluid passage 156 may be substantially orthogonal to the recess axis A4 and/or component axis CA.

In use, the localized cavity 162 may be pressurized with fluid to release the tapered connection 127. The coupling bore 136 may be dimensioned to be releasably coupled to an actuation device (e.g., hydraulic taper separator) 172 (shown in dashed lines). The actuation device 172 may be adapted to communicate fluid F through the fluid passage 156 to cause separation of the taper connection 127 in response to pressurizing the localized cavity 162.

The novel implant systems and methods of this disclosure may provide versatility in repairing bone defects restoring functionality to bones and/or joints. The disclosed techniques may be utilized to release taper connections between orthopaedic components. The disclosed implant systems may include components that establish a taper connection. A hydraulic force may be utilized to separate the taper connection. An actuation device such as a hydraulic pump may be utilized to establish the hydraulic force. The actuation device may be relatively compact, which may reduce exposure to the joint and soft tissue repair associated with incisions in the tissue. The disclosed techniques may provide the surgeon versatility in changing a configuration of the implant, which may improve healing and mobility.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should further be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure.

What is claimed is:

1. An orthopaedic implant system comprising:
   a head component associated with an articulation surface dimensioned to mate with an opposed articular surface of an adjacent implant or an adjacent bone;
   a mounting component including a mounting body, the mounting body including a fluid passage interconnecting a tapered recess and a mounting bore, the mounting bore extending from an engagement face and dimensioned to receive a fastener for securing the head component along the engagement face, the tapered recess extending along a first axis, and the mounting bore extending along a second axis transverse to the first axis;
   a second component including a tapered portion insertable in the tapered recess to establish a taper connection; and
   a hydraulic pump including an interface portion dimensioned to engage the mounting bore, wherein the pump is adapted to communicate fluid through the fluid passage to cause separation of the taper connection.

2. The system as recited in claim 1, wherein the head component includes a head bore, and the head bore and the mounting bore are dimensioned to receive the fastener to attach the head component and the mounting component to each other such that the fastener blocks access to the fluid passage.

3. The system as recited in claim 1, wherein the tapered portion and surfaces of the mounting body bounding the tapered recess cooperate to define a localized cavity in response to establishing the taper connection, the fluid passage interconnects the localized cavity and the mounting bore, and a volume of the localized cavity is less than a combined volume of the mounting bore and the fluid passage.

4. The system as recited in claim 3, wherein the volume of the localized cavity is less than approximately 25 percent of the combined volume of the mounting bore and the fluid passage.

5. The system as recited in claim 3, wherein:
   the mounting body defines a second recess between the tapered recess and the fluid passage;
   the second component includes a protrusion extending outwardly from the tapered portion to a free end of the second component, and a maximum diameter of the protrusion is less than a minimum diameter of the second recess; and
   the protrusion is insertable in the second recess to establish the localized cavity that extends about a periphery of the protrusion.

6. The system as recited in claim 1, wherein the hydraulic pump includes a pump body and a plunger insertable in a cavity of the pump body, and the plunger is movable to cause pressurization of the fluid passage.

7. The system as recited in claim 6, wherein the hydraulic pump includes at least one seal adapted to establish a sealing relationship between the plunger and surfaces of the cavity.

8. The system as recited in claim 1, wherein the head component is adapted to mount an articulation component establishing the articulation surface.

9. The system as recited in claim 1, wherein the mounting body extends along a longitudinal axis between a first end and a second end, the tapered recess extends inwardly from the second end, and the engagement face is dimensioned to extend along a reference plane oblique to the longitudinal axis.

10. The system as recited in claim 9, wherein the first axis of the tapered recess is substantially parallel to the longitudinal axis.

11. The system as recited in claim 1, wherein the mounting bore widens from a fluid port that interconnects the mounting bore and the fluid passage.

12. The system as recited in claim 1, wherein the second component is a stem insertable in bone.

13. An orthopaedic implant system comprising:
    a first component including a female tapered portion and a mounting bore;
    a second component including a male tapered portion dimensioned to cooperate with the female tapered portion to establish a taper connection and a localized cavity; and
    a hydraulic pump adapted to communicate fluid through the mounting bore to cause separation of the taper connection in response to pressurizing the localized cavity.

14. The system as recited in claim 13, wherein the mounting bore extends from an engagement face and is dimensioned to receive a fastener for securing an adjacent component along the engagement face.

15. An orthopaedic implant system comprising:
    a head component associated with an articulation surface dimensioned to mate with an opposed articular surface of an adjacent implant or an adjacent bone;
    a mounting component including a mounting body, the mounting body including a first tapered portion and a mounting bore, the mounting bore extending from an engagement face and dimensioned to receive a fastener for securing the head component along the engagement face, and the mounting bore transverse to the first tapered portion;

a second component including a second tapered portion dimensioned to cooperate with the first tapered portion to establish a taper connection and a localized cavity; and a hydraulic pump adapted to communicate fluid through the mounting bore to cause separation of the taper connection in response to pressurizing the localized cavity.

16. The system as recited in claim 15, wherein the first tapered portion of the mounting component includes a female taper, and the second tapered portion of the second component includes a male taper dimensioned to engage the female taper to establish the taper connection.

17. The system as recited in claim 15, wherein the hydraulic pump is releasably securable to the mounting bore at a threaded connection.

18. An orthopaedic implant system comprising:

a first component including a main body extending along a component axis between a first end and a second end, the main body including a first tapered portion and a coupling bore, wherein the first tapered portion extends from the first end, and the coupling bore extends inwardly from an outer periphery of the main body between the first and second ends;

a second component including a second tapered portion dimensioned to cooperate with the first tapered portion to establish a taper connection and a localized cavity; and a hydraulic pump adapted to communicate fluid through the coupling bore to cause separation of the taper connection in response to pressurizing the localized cavity.

19. The system as recited in claim 18, wherein the coupling bore extends along a bore axis that intersects a periphery of the localized cavity.

20. The system as recited in claim 18, wherein the coupling bore extends along a bore axis, and the bore axis is substantially orthogonal to the component axis.

* * * * *